United States Patent Office 2,927,940
Patented Mar. 8, 1960

2,927,940

4-CHLORO-2-HYDROXYMETHYLPHENOXY-ACETIC ACID AND ITS DERIVATIVES

Jean Metivier, Arpajon, and Roger Boesch, Paris, France, assignors to Societe des Usines Chimiques Rhone-Poulenc, Paris, France, a French body corporate No Drawing. Application February 19, 1958
Serial No. 716,028

Claims priority, application France June 9, 1956

1 Claim. (Cl. 260—473)

This invention relates to phenoxyacetic acid derivatives and more particularly to 2-hydroxymethyl-4-chlorophenoxy acetic acid, its salts, esters and amides, and to compositions containing one or more of such compounds and useful for the modification of plant growth.

The use in agriculture and horticulture of various types of chemicals for the purpose of modifying plant growth is now a customary practice, and a considerable number of such substances are employed on a very large scale for producing various different effects upon plant growth. These effects include modification of growth for the purpose of enhancing the useful yield of crops later to be gathered from the plants so modified, and the destruction of unwanted plants, i.e. weeds in areas containing useful crops.

Of recent years, the so-called "auxins" have become particularly important as selective herbicides, their lethal effect being a physiological and systemic one rather than that of a plant poison which simply alters and destroys. The advent of such highly successful auxins as 2:4-dichlorophenoxy-acetic acid derivatives and 4-chloro-2-methylphenoxyacetic acid derivatives has greatly stimulated research and development throughout the world but there is still much that is not known concerning the precise relationship between chemical structure of the auxin and effect upon plant growth as to variation of effect according to concentration and structure of the chemical employed (in some cases the chemical acts at low concentration to modify plant growth in a useful way and at a higher concentration to kill the plant) such that prediction as to effect on plant growth of change in chemical structure of the auxin cannot yet be made with anything like reasonable certainty. This is particularly so in the field of the aryloxyaliphatic compounds as is emphasized by Shaw and Gentner ("Weeds," Journal of the Weed Society of America V, (2): 75 to 90, 1957). There is indeed difficulty in using derivatives of the known phenoxyacetic acids due to the variation of the derivatives in respect of their secondary actions and phytotoxicity.

These disadvantages are well known; compare, for example L. J. Audus "Plant Growth Substances," Leonard Hill Ltd., London, 1953. Considering more particularly the formation of new organs, this author (pages 104–105) recalls that while numerous derivatives of (2:4-dichloro-2:4-dibromo-, 2:5-dimethyl-, 2:4:5-trichloro-)phenoxyacetic acid or of phenoxypropionic or butyric acids have shown an activity comparable to that of γ-(3-indole)-butyric acid or to that of α-naphthylacetic acid, it is nevertheless true that these products are difficult to use. The author says on page 105: "All these phenoxy compounds suffer from the disadvantage of having undesirable secondary properties that make their practical applications hazardous. Thus they are all prone to produce thick stunted roots and have a toxicity limit very near the optimum rooting concentration. Extreme care is therefore necessary in adjusting the concentration levels applied to avoid high cutting mortality. In addition the spread of these compounds up the shoot can affect its subsequent growth adversely."

Similarly, in the treatments for the formulation and maturing of fruits, phenoxyacetic acids exhibit some activity, but few have any practical application and those which would lend themselves best thereto give rise to the toxicity manifestations emhasized by Audus, page 148.

It is the object of this invention to provide new aryloxyaliphatic compounds and compositions containing them which possess useful plant growth regulating properties which could not have been predicted from knowledge of their chemical structure.

The compounds of the present invention are 2-hydroxymethyl-4-chlorophenoxy acetic acid of the formula:

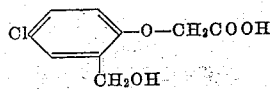

I.

and the salts, esters and amides of this acid. Among the possible salts, alkali metal salts or those derived from aliphatic amines are preferred. Convenient esters are alkyl esters. The amides may be N-mono- or di-substituted by lower alkyl groups. The compounds of the invention are preferably in the form of free acid, alkali metal salt or amide.

The compounds of the present invention may be prepared by the reduction of the corresponding formyl compounds of the general formula:

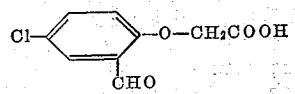

II.

or a salt, ester or amide thereof. The reduction of the formyl group to hydroxymethyl may be carried out by known methods; in particular, by the action of hydrogen in the presence of Raney nickel or with formaldehyde and an ankali metal hydroxide, such as sodium or potassium hydroxide.

They may also be obtained by reacting 2-hydroxymethyl-4-chlorophenol with a haloacetic acid, e.g. chloracetic or bromacetic acid or a salt, ester or amide thereof.

It is particularly advantageous to carry out the reaction in the presence of an alkaline condensation agent such as sodium hydroxide, potassium hydroxide or sodium carbonate, which may be added to a mixture of the reactants. Alternatively, the 2-hydroxymethy-4-chlorophenol may first be converted into an alkali metal phenate before being reacted with the halogen derivative of the aliphatic acid, which is then employed in the form of an alkali metal salt. It is convenient to effect the reaction in an organic medium such as an alcohol, e.g. ethanol, or a hydrocarbon, e.g. benzene or toluene.

The new 2-hydroxymethyl-4-chloro-phenoxyacetic acid and its salts, esters and amides of the present invention possess interesting properties and are especially useful in the agricultural field. They possess, in particular, a powerful hormonal action which is manifested in the laboratory by (a) acceleration of the functioning of the meristematic tissue (increase in stem thickness)—shown by the lanolin ring test using 1% active product; (b) by the formation of new organs (roots)—shown by the test for the formation of roots on the leaves of tomato plants or the stems of beans plants, and (c) by the production of parthenocarpic fruits (without natural fertilization to produce seedless fruits)—shown by the treatment of emasculated tomato flowers. In this regard the aforesaid new compounds markedly differ from known products typified by 2:4-dichlorophenoxyacetic acid. Thus, in contradistinction to these known products their phytotoxic activity is small while their hormonal activity is exhibited at very small dosage levels. In consequence they can be used as plant hormones without the risk of damage to or destruction of the plant that occurs with such products as 2:4-dichlorophenoxyacetic acid. It may further be noted that 2-chloromethyl-4-chlorophenoxy-acetic acid has a relatively much lower activity.

For agricultural purposes the compounds of this invention may be employed in any of the physical forms in which plant-growth regulants or herbicides of the 2:4-dichlorophenoxyacetic acid type are customarily used; in all cases in association with an inert diluent and in a concentration of at least 0.1 part per million parts of diluent. In the case of water-soluble compounds, e.g. the alkali metal salts, it is convenient to employ an aqueous solution where application in liquid form is desired. Alternatively, they may be used as solid compositions in conjunction, therefore, with solid diluents such as talc, clay or other such inert material. In the case of compounds insoluble or but sparingly soluble in water, it is convenient to employ them in the form of an aqueous emulsion incorporating a wetting, dispersing or emulsifying agent of the ionic or non-ionic type, the latter being preferred since they are not affected by electrolytes. The latter type of formulation is preferably made up as a self-emulsifying concentrate containing the active substance dissolved in the dispersing agent or in a solvent compatible with that dispersing agent, the composition being made ready for use by the simple addition of water. Specific compositions include aqueous solutions of the water-soluble salts or amides which may contain a wetting agent, wettable powders containing either acid or amide in association with diluent powder and wetting agent, oil emulsions containing one or more of the esters and micronised oil suspensions of either acid or amide.

The following examples illustrate the present invention; the melting points were determined on the Kofler bench.

Example I

To a suspension of 2-formyl-4-chlorophenoxyacetic acid (10.7 g.) in water (40 cc.) are added an aqueous 30% formaldehyde solution (6.5 g.) and then a solution of sodium hydroxide (6 g.) in water (6 cc.). After standing overnight at laboratory temperature, the mixture is acidified with hydrochloric acid ($d=1.19:15$ cc.). The precipitate obtained is filtered off, washed with water and dried. 2-hydroxymethyl-4-chlorophenoxyacetic acid (9.5 g.), M.P. 142° C., is obtained. On recrystallisation from water, the melting point of the product is raised to 145° C.

The 2-formyl-4-chlorophenoxyacetic acid used as starting material may be prepared in accordance with the procedure of Stoermer: Ann. 312; 326 (1900).

Example II

A solution of 2-formyl-4-chlorophenoxyacetic acid (21.5 g.) in N sodium hydroxide (101 cc.) is prepared. Raney nickel (5 g.) is added to the solution obtained, and the mixture is hydrogenated until absorption of hydrogen ceases. After separation of the catalyst, the solution is acidified with hydrochloric acid ($d=1.19:15$ cc.) and the precipitate formed is filtered off, washed and dried. 2-hydroxymethyl-4-chlorophenoxyacetic acid (17.7 g.) which melts at 142° C., is obtained.

Example III 2-formyl-4-chlorophenoxyacetamide (20 g.) is dissolved in ethanol (300 cc.). Raney nickel (9 g.) is added to the solution obtained and the mixture is hydrogenated until the absorption of hydrogen ceases. After separation of the catalyst, the solvent is driven off in vacuo and, after drying the residue, there is obtained 2-hydroxymethyl-4-chlorophenoxyacetamide (20 g.), M.P. 135° C. Recrystallisation from ethanol does not change the melting point of the product.

The 2-formyl-4-chlorophenoxyacetamide used as starting material is prepared by reacting 20% ammonia with 2-formyl-4-chlorophenoxyacetyl chloride. After two recrystallisations from 50% ethanol, the product melts at about 189° C.

The 2-formyl-4-chlorophenoxyacetyl chloride may be obtained by the action of thionyl chloride on 2-formyl-4-chlorophenoxyacetic acid in benzene.

Example IV

A mixture of 2-hydroxymethyl-4-chlorophenol (15.8 g.), monochloracetic acid (9.5 g.) and 10% sodium hydroxide solution (80 cc.) is heated for 5 hours at 90–100° C. After cooling, the mixture is made acid to Congo red with 2 N hydrochloric acid. An oil separates and crystallises rapidly. The solid obtained is dissolved in ether and extracted with a solution of sodium bicarbonate (16 g.) in water (200 cc.). The aqueous solution is treated with decolourising charcoal and made acid to Congo red by 2 N hydrochloric acid. The solid which precipitates is filtered off and dried. 2-hydroxymethyl-4-chlorophenoxyacetic acid (13 g.), M.P. 142° C., is thus obtained. After recrystallisation from dilute alcohol, the product melts at 142–143° C.

The 2-hydroxymethyl-4-chlorophenol employed as starting material may be prepared, for example, in accordance with the procedure of Rivals: A. Ch. et Phys. [7], 12, 566 (1897).

Example V

A mixture of N:N-diethyl-2-formyl-4-chlorophenoxyacetamide (40.4 g.) in solution in ethyl alcohol (300 cc.) is hydrogenated at atmospheric pressure in the presence of Raney nickel (14 g.). When the theoretical quantity of hydrogen has been absorbed, the nickel is filtered off and the limpid filtrate obtained is concentrated under a pressure of 15–20 mm. Hg by heating at 40–50° C. The residue obtained (40 g.) melts at about 86° C. On recrystallisation from 50% ethanol, there is obtained N:N-diethyl - 4 - chloro-2-hydroxymethyl - phenoxy-acetamide, M.P. 88° C.

The N:N-diethyl-2-formyl-4-chlorophenoxyacetamide employed as starting material melts at 69–70° C. It is prepared by the action of diethylamine on 2-formyl-4-chlorophenoxyacetyl chloride.

Example VI

To a solution of 22.8 g. of the methyl ester of 2-formyl-4-chlorophenoxyacetic acid in 400 cc. of methyl alcohol are added 10 g. of Raney nickel, and the mixture is hydrogenated at atmospheric pressure and at room temperature. When all the hydrogen has been absorbed, the nickel is filtered off and the solution is concentrated under a pressure of 20–30 mm. Hg at 40–50° C. A residue weighing 22 g. then remains.

The residue thus obtained is dissolved in 150 cc. of ether, washed with water and dried over sodium sulphate. When the ether has been driven off, 18 g. of 2-hydroxymethyl-4-chlorophenoxyacetic acid methyl ester, B.P. 166–170° C./1 mm. Hg, are separated by distillation.

The methyl ester of 2-formyl-4-chlorophenoxyacetic acid employed as initial material is prepared by the action of 2-formyl-4-chlorophenoxyacetyl chloride on methanol in the presence of triethylamine. It melts at 69° C.

Example VII

A solution of 22 g. of 2-formyl-4-chlorophenoxy-N-methylacetamide in 300 cc. of ethyl alcohol is hydrogenated at atmospheric pressure and at room temperature in the presence of 10 g. Raney nickel. When all the hydrogen has been absorbed, the nickel is filtered off and the solvent is driven off under reduced pressure. The residue obtained (22.5 g.) is crystallised from 42 cc. of ethyl alcohol. There are finally obtained 18.5 g. of 2-hydroxymethyl-4-chlorophenoxy - N - methylacetamide, M.P. 98° C.

The 2-formyl-4-chlorophenoxy-N-methylacetamide employed as starting material melts at 168° C.

Example VIII

The procedure of Example VII is followed, but 24.1 g. of 2-formyl-4-chlorophenoxy-N-dimethylacetamide are employed as starting material. After recrystallisation from ethyl alcohol, 16.5 g. of 2-hydroxymethyl-4-chlorophenoxy-N-dimethylacetamide are obtained, M.P. 105° C.

The 2-formyl-4-chlorophenoxy-N-dimethylacetamide employed as starting material melts at 98° C.

Example IX

To a suspension of 20 g. of 2-hydroxymethyl-4-chlorophenoxy-acetic acid in 100 cc. of water are added 7 g. of diethylamine. The latter is completely dissolved and the solution obtained is diluted to 1 litre with water. The solution obtained contains 20 g./litre of 2-hydroxymethyl-4-chlorophenoxyacetic acid in the form of its diethylamine salt.

Example X

A hormone preparation suitable for use e.g. in the production of parthenocarpic fruits is prepared as follows: 4-chloro-2-hydroxymethyl-phenoxyacetic acid (2 g.), N sodium hydroxide (9.2 cc.), acetone (2 cc.) and glycerine (15 cc.) are dissolved in water and the volume is made up to 100 cc. by addition of water. There is thus obtained a 2% solution of 4-chloro-2-hydroxymethyl-phenoxyacetic acid which may be diluted when required for application.

This application is a continuation-in-part of application No. 663,867 filed June 6, 1957, now abandoned.

We claim:

A member of the class consisting of 4-chloro-2-hydroxy-methyl-phenoxyacetic acid and alkali metal salts, lower aliphatic amine salts, lower alkyl esters, unsubstituted amides and lower alkyl N-mono- and N-disubstituted amides thereof.

References Cited in the file of this patent

UNITED STATES PATENTS 2,740,810　　Skeeters _____ Apr. 3, 1956

OTHER REFERENCES

Thompson et al.: Chem. Abst., 41, 3904 (1947).
Brown et al.: J. Chem. Soc. (London), 3681–3683 (1955).